United States Patent [19]

Suga

[11] Patent Number: 5,699,359

[45] Date of Patent: Dec. 16, 1997

[54] AUDIO-VIDEO AND CONTROL INTERFACES FOR MULTI-MEDIA PERSONAL COMPUTER PACKET COMMUNICATION

[75] Inventor: Takaaki Suga, Kawasaki, Japan

[73] Assignee: Fujitsu Limited, Kawasaki, Japan

[21] Appl. No.: 456,625

[22] Filed: Jun. 1, 1995

[30] Foreign Application Priority Data

Jun. 23, 1994 [JP] Japan ................................. 6-141349
Mar. 20, 1995 [JP] Japan ................................. 7-060240

[51] Int. Cl.$^6$ ................................................. H04J 3/24
[52] U.S. Cl. ..................... 370/395; 364/514 R; 370/232; 370/507
[58] Field of Search ..................... 370/94.1, 94.2, 370/94.3, 62, 110.1, 103, 84, 389, 395, 260, 259, 522, 507, 232; 364/514 R; 379/90

[56] References Cited

U.S. PATENT DOCUMENTS

| | | | |
|---|---|---|---|
| 5,539,449 | 7/1996 | Blahut et al. | 379/90 |
| 5,555,244 | 9/1996 | Gupta et al. | 370/84 |
| 5,555,261 | 9/1996 | Nakayama et al. | 370/103 |
| 5,557,541 | 9/1996 | Schulhof et al. | 364/514 R |

FOREIGN PATENT DOCUMENTS

| | | | |
|---|---|---|---|
| 3-10534 | 1/1991 | Japan | H04L 12/28 |
| 3-58540 | 3/1991 | Japan | H04L 12/42 |

*Primary Examiner*—Douglas W. Olms
*Assistant Examiner*—Shick Hom
*Attorney, Agent, or Firm*—Staas & Halsey

[57] ABSTRACT

A multimedia communications apparatus allows a multimedia personal computer to freely select a unit with which to communicate, so that the circuit usage efficiency of a network connected to the multimedia communications apparatus will be increased. The multimedia communications apparatus has a packet generator/separator, a packet type detector, a controller, and a table. The table stores data representing the correspondence between addresses of interfaces of the multimedia personal computer and AV devices and addresses thereof on the network. For communications, the controller refers to the table to establish logic paths from a unit with which to communicate and a transmission range depending on multimedia such as moving-image data, sound data, or the like to be transmitted, and rewrites the headers of packets based on the established logic paths. The packet type detector captures empty packets required for each session of communications, and the packet generator/separator updates a destination unit address, inserts multimedia information, and transmits the packets to the destination unit address. Upon completion of the transmission, the packet generator/separator releases the packets from the dedicated state.

12 Claims, 15 Drawing Sheets

|  27a | 27b | 27c | 27d | 27e |
|---|---|---|---|---|
| NODE ADDRESS | CHANNEL ADDRESS | VISCA ADDRESS | INTERFACE TYPE | COMMUNICATION RATE |
| 1 | 1 | 1 | NTSC | 45Mbps |
| 1 | 2 | 1 | RS232C | 9600bps |
| 2 | 1 | 2 | NTSC | 45Mbps |
| 2 | 2 | 2 | RS232C | 9600bps |
| 3 | 1 | 3 | NTSC | 45Mbps |
| 3 | 2 | 3 | RS232C | 9600bps |
| 4 | 1 | 0 | NTSC | 45Mbps |
| 4 | 2 | 0 | RS232C | 9600bps |

FIG. 2

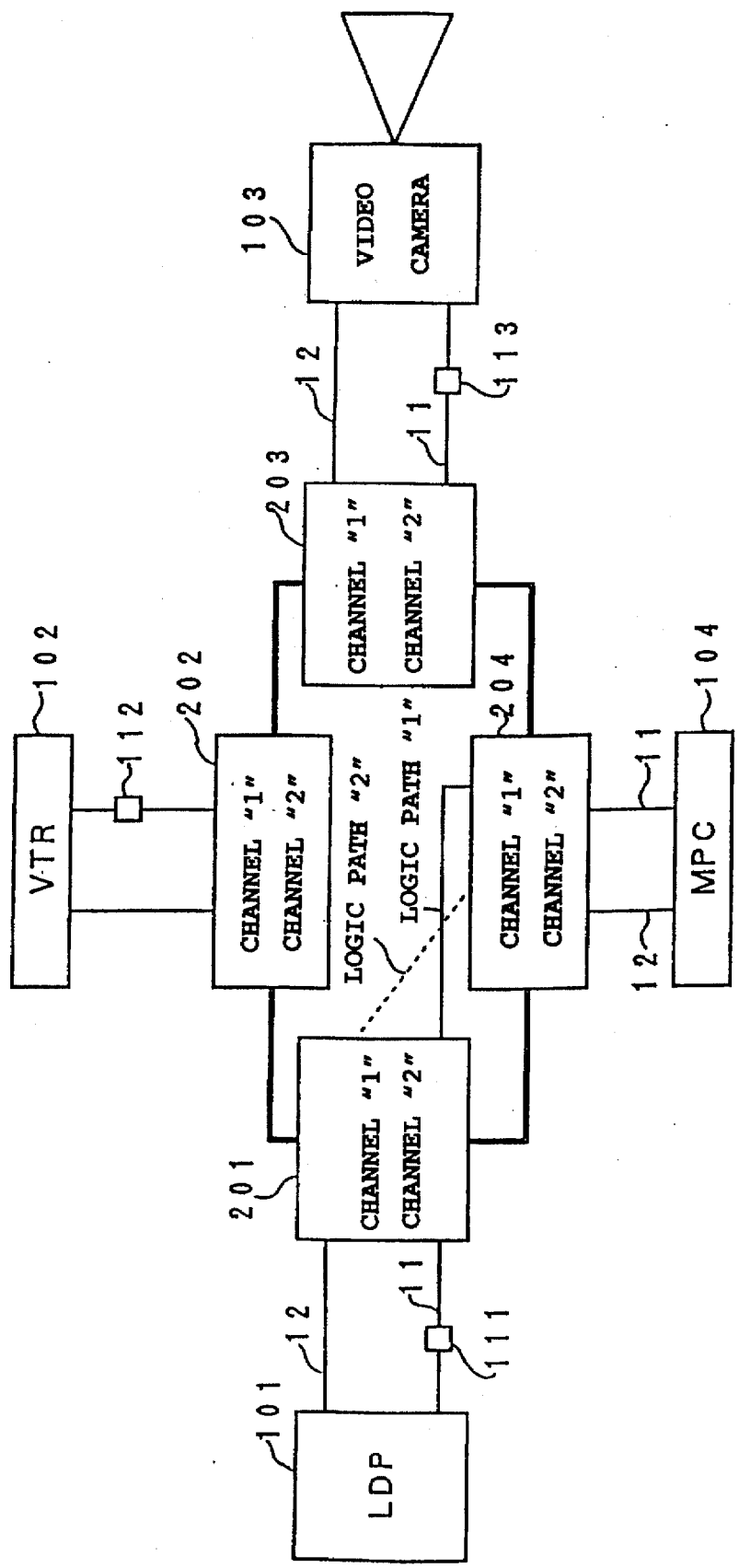
F I G. 4

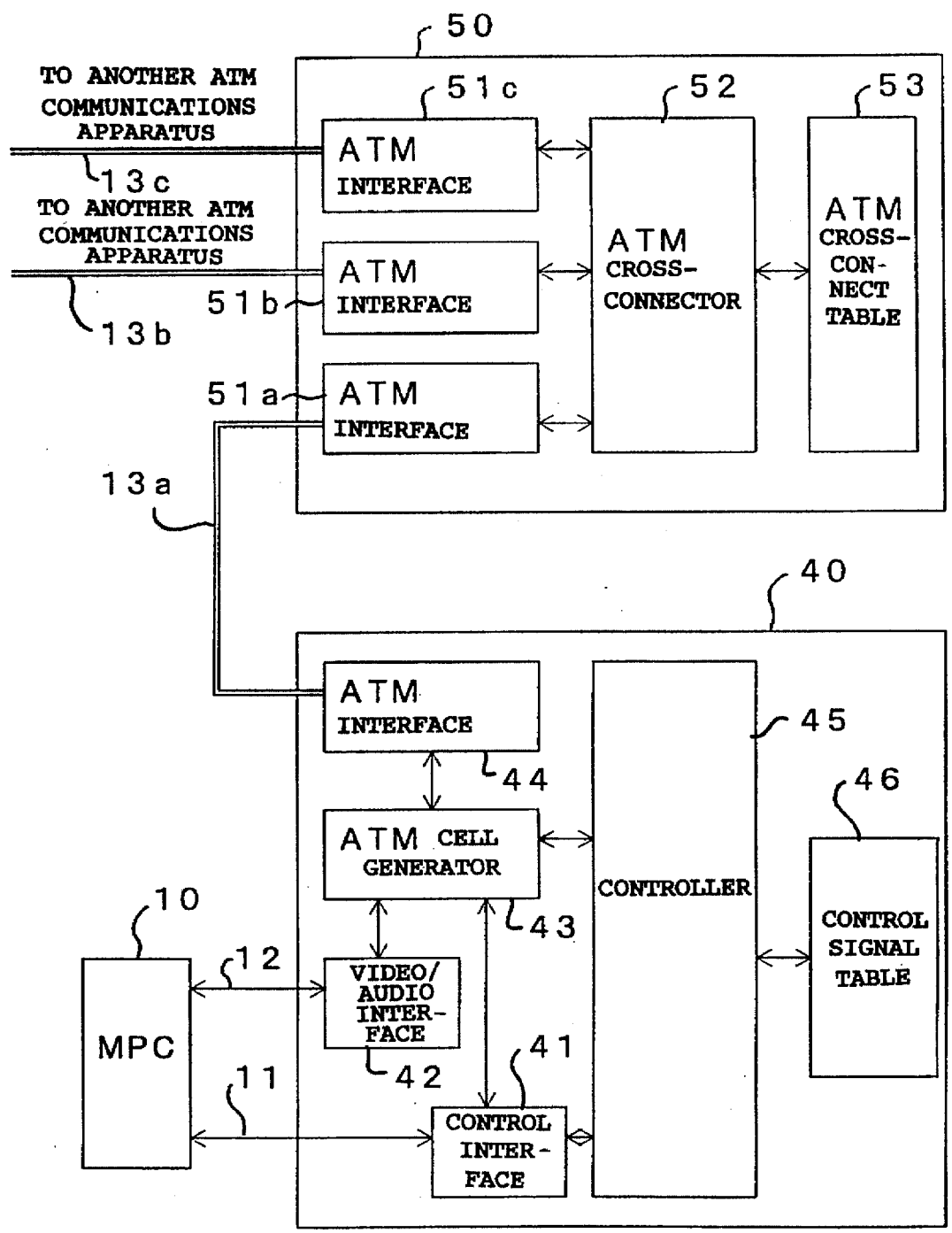
F I G. 5

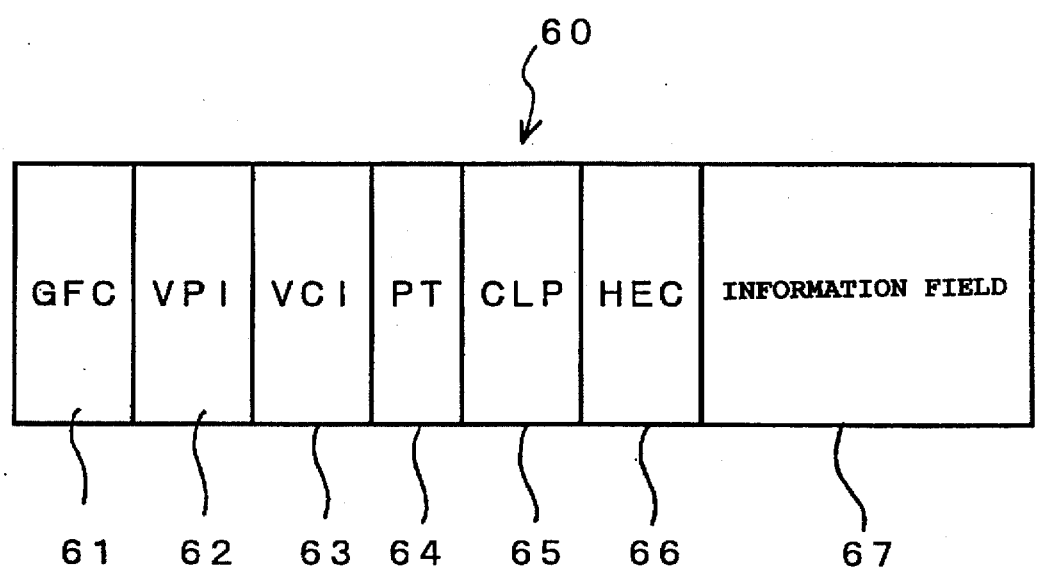
F I G. 6

| ORIGINATING UNIT ADDRESS | DESTINATION UNIT ADDRESS | VPI | VCI | TRANS-MISSION BAND | SIGNAL TYPE |
|---|---|---|---|---|---|
| VISCA ADDRESS 0 | VISCA ADDRESS 1 | 10 | 1 | 9600bps | VISCA COMMAND |
| VISCA ADDRESS 0 | VISCA ADDRESS 1 | 10 | 2 | 10Mbps | NTSC |
| VISCA ADDRESS 1 | VISCA ADDRESS 0 | 10 | 5 | 9600bps | VISCA COMMAND |
| VISCA ADDRESS 1 | VISCA ADDRESS 0 | 10 | 6 | 10Mbps | NTSC |
| VISCA ADDRESS 0 | VISCA ADDRESS 2 | 10 | 3 | 9600bps | VISCA COMMAND |
| VISCA ADDRESS 0 | VISCA ADDRESS 2 | 10 | 4 | 10Mbps | NTSC |
| VISCA ADDRESS 2 | VISCA ADDRESS 0 | 10 | 7 | 9600bps | VISCA COMMAND |
| VISCA ADDRESS 2 | VISCA ADDRESS 0 | 10 | 8 | 10Mbps | NTSC |
| VISCA ADDRESS 1 | VISCA ADDRESS 2 | 10 | 3 | 9600bps | VISCA COMMAND |
| VISCA ADDRESS 1 | VISCA ADDRESS 2 | 10 | 4 | 10Mbps | NTSC |
| VISCA ADDRESS 2 | VISCA ADDRESS 1 | 10 | 1 | 9600bps | VISCA COMMAND |
| VISCA ADDRESS 2 | VISCA ADDRESS 1 | 10 | 2 | 10Mbps | NTSC |

FIG. 8

| ORIGINATING UNIT ADDRESS | DESTINATION UNIT ADDRESS | VPI | VCI | TRANS-MISSION BAND | SIGNAL TYPE |
|---|---|---|---|---|---|
| VISCA ADDRESS 0 | VISCA ADDRESS 1 | 20 | 5 | 9600bps | VISCA COMMAND |
| VISCA ADDRESS 0 | VISCA ADDRESS 1 | 20 | 6 | 10Mbps | NTSC |
| VISCA ADDRESS 1 | VISCA ADDRESS 0 | 20 | 1 | 9600bps | VISCA COMMAND |
| VISCA ADDRESS 1 | VISCA ADDRESS 0 | 20 | 2 | 10Mbps | NTSC |
| VISCA ADDRESS 0 | VISCA ADDRESS 2 | 20 | 3 | 9600bps | VISCA COMMAND |
| VISCA ADDRESS 0 | VISCA ADDRESS 2 | 20 | 4 | 10Mbps | NTSC |
| VISCA ADDRESS 2 | VISCA ADDRESS 0 | 20 | 1 | 9600bps | VISCA COMMAND |
| VISCA ADDRESS 2 | VISCA ADDRESS 0 | 20 | 2 | 10Mbps | NTSC |
| VISCA ADDRESS 1 | VISCA ADDRESS 2 | 20 | 3 | 9600bps | VISCA COMMAND |
| VISCA ADDRESS 1 | VISCA ADDRESS 2 | 20 | 4 | 10Mbps | NTSC |
| VISCA ADDRESS 2 | VISCA ADDRESS 1 | 20 | 7 | 9600bps | VISCA COMMAND |
| VISCA ADDRESS 2 | VISCA ADDRESS 1 | 20 | 8 | 10Mbps | NTSC |

F I G. 9

| ORIGINATING UNIT ADDRESS | DESTINATION UNIT ADDRESS | VPI | VCI | TRANS-MISSION BAND | SIGNAL TYPE |
|---|---|---|---|---|---|
| VISCA ADDRESS 0 | VISCA ADDRESS 1 | 30 | 1 | 9600bps | VISCA COMMAND |
| VISCA ADDRESS 0 | VISCA ADDRESS 1 | 30 | 2 | 10Mbps | NTSC |
| VISCA ADDRESS 1 | VISCA ADDRESS 0 | 30 | 3 | 9600bps | VISCA COMMAND |
| VISCA ADDRESS 1 | VISCA ADDRESS 0 | 30 | 4 | 10Mbps | NTSC |
| VISCA ADDRESS 0 | VISCA ADDRESS 2 | 30 | 7 | 9600bps | VISCA COMMAND |
| VISCA ADDRESS 0 | VISCA ADDRESS 2 | 30 | 8 | 10Mbps | NTSC |
| VISCA ADDRESS 2 | VISCA ADDRESS 0 | 30 | 3 | 9600bps | VISCA COMMAND |
| VISCA ADDRESS 2 | VISCA ADDRESS 0 | 30 | 4 | 10Mbps | NTSC |
| VISCA ADDRESS 1 | VISCA ADDRESS 2 | 30 | 5 | 9600bps | VISCA COMMAND |
| VISCA ADDRESS 1 | VISCA ADDRESS 2 | 30 | 6 | 10Mbps | NTSC |
| VISCA ADDRESS 2 | VISCA ADDRESS 1 | 30 | 1 | 9600bps | VISCA COMMAND |
| VISCA ADDRESS 2 | VISCA ADDRESS 1 | 310 | 2 | 10Mbps | NTSC |

| DIRECTION OF TRANSMISSION 531a | ATM TRANSMISSION PATH (FOR RECEPTION) 531b | VPI 531c | VCI 531d | ATM TRANSMISSION PATH (FOR TRANSMISSION) 531e | VPI 531f | VCI 531g | TRANS-MISSION BAND 531h |
|---|---|---|---|---|---|---|---|
| 1ST CLADDING ⇒ 2ND CLADDING | SLOT 1 | 10 | 1 | SLOT 2 | 12 | 1 | 9600bps |
| 1ST CLADDING ⇒ 2ND CLADDING | SLOT 1 | 10 | 2 | SLOT 2 | 12 | 2 | 10Mbps |
| 1ST CLADDING ⇒ 3RD CLADDING | SLOT 1 | 10 | 3 | SLOT 3 | 13 | 1 | 9600bps |
| 1ST CLADDING ⇒ 3RD CLADDING | SLOT 1 | 10 | 4 | SLOT 3 | 13 | 2 | 10Mbps |
| 2ND CLADDING ⇒ 1ST CLADDING | SLOT 2 | 12 | 3 | SLOT 1 | 10 | 5 | 9600bps |
| 2ND CLADDING ⇒ 1ST CLADDING | SLOT 2 | 12 | 4 | SLOT 1 | 10 | 6 | 10Mbps |
| 3RD CLADDING ⇒ 1ST CLADDING | SLOT 3 | 13 | 3 | SLOT 1 | 10 | 7 | 9600bps |
| 3RD CLADDING ⇒ 1ST CLADDING | SLOT 3 | 13 | 4 | SLOT 1 | 10 | 8 | 10Mbps |

FIG. 12

| DIRECTION OF TRANSMISSION | ATM TRANSMISSION PATH (FOR RECEPTION) | VPI | VCI | ATM TRANSMISSION PATH (FOR TRANSMISSION) | VPI | VCI | TRANS-MISSION BAND |
|---|---|---|---|---|---|---|---|
| 2ND CLADDING ⇒ 1ST CLADDING | SLOT 1 | 20 | 1 | SLOT 2 | 12 | 3 | 9600bps |
| 2ND CLADDING ⇒ 1ST CLADDING | SLOT 1 | 20 | 2 | SLOT 2 | 12 | 4 | 10Mbps |
| 2ND CLADDING ⇒ 3RD CLADDING | SLOT 1 | 20 | 3 | SLOT 3 | 23 | 1 | 9600bps |
| 2ND CLADDING ⇒ 3RD CLADDING | SLOT 1 | 20 | 4 | SLOT 3 | 23 | 2 | 10Mbps |
| 1ST CLADDING ⇒ 2ND CLADDING | SLOT 2 | 12 | 1 | SLOT 1 | 20 | 5 | 9600bps |
| 1ST CLADDING ⇒ 2ND CLADDING | SLOT 2 | 12 | 2 | SLOT 1 | 20 | 6 | 10Mbps |
| 3RD CLADDING ⇒ 2ND CLADDING | SLOT 3 | 23 | 3 | SLOT 1 | 20 | 7 | 9600bps |
| 3RD CLADDING ⇒ 2ND CLADDING | SLOT 3 | 23 | 4 | SLOT 1 | 20 | 8 | 10Mbps |

FIG. 13

| DIRECTION OF TRANSMISSION | ATM TRANSMISSION PATH (FOR RECEPTION) | VPI | VCI | ATM TRANSMISSION PATH (FOR TRANSMISSION) | VPI | VCI | TRANS-MISSION BAND |
|---|---|---|---|---|---|---|---|
| 3RD CLADDING ⇨ 1ST CLADDING | SLOT 1 | 30 | 1 | SLOT 3 | 23 | 3 | 9600bps |
| 3RD CLADDING ⇨ 1ST CLADDING | SLOT 1 | 30 | 2 | SLOT 3 | 23 | 4 | 10Mbps |
| 3RD CLADDING ⇨ 2ND CLADDING | SLOT 1 | 30 | 3 | SLOT 2 | 13 | 3 | 9600bps |
| 3RD CLADDING ⇨ 2ND CLADDING | SLOT 1 | 30 | 4 | SLOT 2 | 13 | 4 | 10Mbps |
| 1ST CLADDING ⇨ 3RD CLADDING | SLOT 3 | 13 | 1 | SLOT 1 | 30 | 7 | 9600bps |
| 1ST CLADDING ⇨ 3RD CLADDING | SLOT 3 | 13 | 2 | SLOT 1 | 30 | 8 | 10Mbps |
| 2ND CLADDING ⇨ 3RD CLADDING | SLOT 2 | 23 | 1 | SLOT 1 | 30 | 5 | 9600bps |
| 2ND CLADDING ⇨ 3RD CLADDING | SLOT 2 | 23 | 2 | SLOT 1 | 30 | 6 | 10Mbps |

AUDIO-VIDEO AND CONTROL INTERFACES FOR MULTI-MEDIA PERSONAL COMPUTER PACKET COMMUNICATION

BACKGROUND OF THE INVENTION

1. Field of the Invention

The present invention relates to a multimedia communications apparatus, and more particularly, to a multimedia communications apparatus to be connected to a packet or cell network which incorporates a general LAN (Local Area Network) or ATM (Asynchronous Transfer Mode) and also to an AV (audiovisual) device or a multimedia computer which handles multimedia including moving-image and sound data.

2. Description of the Related Art

As the processing capability of personal computers has increased in recent years, there have been a growing number of multimedia personal computers that are capable of freely processing multimedia including moving-image and sound data. Based on the increasing availability of multimedia data bases expected in the future, there will necessarily be a strong demand for access to such multimedia data bases from multimedia personal computers to allow users to freely communicate moving-image and sound data.

There will also be a demand for a more sophisticated communication capability to permit users to take part in simple television-based conferences through multimedia personal computers.

To meet these demands, multimedia personal computers need to be connected to a network capable of communicating multimedia including moving-image and sound data. Multimedia LANs for use in private premises have already been available as commercial products.

FIG. 14 of the accompanying drawings shows a conventional multimedia communications network.

The multimedia communications network shown in FIG. 14 employs existing LANs including an FDDI (Fiber Distributed Data Interface) and Ethernets. Specifically, Ethernets 3 are connected to multimedia communications apparatus 2 (MCA) coupled to each other by an FDDI 1, and multimedia personal computers (MPC) 4 are connected to the respective Ethernets 3, thereby making up a multimedia communications network.

An analog signal of moving-image or sound data is transmitted through the multimedia communications network as follows: An image signal from a video camera 5 is supplied to a capture card 6 mounted in one of the multimedia personal computers 4, and converted into a digital image signal by the capture card 6. The multimedia personal computer 4 then converts the digital image signal into Ethernet frames, and sends the converted digital image signal to another multimedia personal computer 4 over the Ethernets 3 and the FDDI 1.

Since the image signal has been converted into the digital signal by the multimedia personal computer 4, the image signal can be transmitted in the same manner as with ordinary data file transfer. The FDDI 1 transmits FDDI frames that are composed of the Ethernet frames to which headers (variable) have been added by the multimedia communications apparatus 2. Because the multimedia personal computer 4 as terminals are connected by the LANs composed of the Ethernets 3 and the FDDI 1, users of the terminals can communicate freely with anybody on the multimedia communications network.

FIG. 15 of the accompanying drawings shows another conventional multimedia communications network.

In FIG. 15, video cameras 5 or video monitors 7 are directly connected to multimedia communications apparatus (MCA) 2a which are connected to each other by a peer-to-peer LAN 1a. The peer-to-peer LAN 1a allows either one of the multimedia communications apparatus 2a to serve as a server or a client.

LANs that handle real-time data including moving-image and sound data are required to have minimized and fixed delay times, and are assigned fixed communication ranges regardless of whether such communication ranges are used or not. Since multimedia communications apparatus are given fixed communication ranges as well as fixed units with which to communicate, they can transmit analog data in a given period of time to any of the units.

In the multimedia communications network which employs the FDDI 1 and the Ethernets 3, analog signals to be transmitted have to be converted into digital signals, and the multimedia personal computers 4 are necessarily required to generate frames for use on the Ethernets 3. For communications between AV devices such as video cameras, laser disc players, or the like over the multimedia communications network, multimedia personal computers are generally required to convert analog data into digital data and convert them into frames for use on the Ethernets 3.

With the peer-to-peer LAN configuration, the multimedia communication apparatus are connected merely in one-to-one correspondence, and only the LAN with fixed addresses and communication ranges is available as a communication path between the multimedia communication apparatus. Because of the fixed allocation of communication ranges, the communication ranges are dedicated regardless of whether they are used or not.

SUMMARY OF THE INVENTION

It is an object of the present invention to provide a multimedia communications apparatus which allows a multimedia personal computer to freely select a unit with which to communicate, so that the circuit usage efficiency of a network connected to the multimedia communications apparatus will be increased.

Another object of the present invention is to provide a multimedia communications apparatus which can determine in advance a transmission rate for a network connected to the multimedia communications apparatus, with respect to each of media or data types to be transmitted.

Still another object of the present invention is to provide a multimedia communications apparatus which is capable of releasing a packet in use after completion of communications.

Yet still another object of the present invention is to provide a multimedia communications apparatus which, if unable to capture a packet needed to transfer media, can indicate such a condition to a unit with which to communicate.

To achieve the above objects, there is provided a multimedia communications apparatus for being connected to a packet or cell network and an AV device or a multimedia computer which handles multimedia including moving-image and sound data. The multimedia communications apparatus comprises a control interface for transmitting an AV device control signal to and receiving an AV device control signal from the AV device or the multimedia computer which is connected, a video/audio interface for transmitting moving-image data or sound data to and receiving moving-image data or sound data from the AV device or the multimedia computer, a packet generator/separator for generating packets or cells based on data received from the control interface and the video/audio interface, and separating packets or cells received from the network and transmitting the packets or the cells to the control interface and the video/audio interface, and control means for controlling the packet generator/separator to separate packet data or cell data transmitted from the network and having an originating unit address and a destination unit address and transmit the separated packet data or cell data to the AV device or the multimedia computer, and controlling the packet generator/separator to generate packets or cells from data which are received from the AV device or the multimedia computer based on the packet or cell data transmitted thereto, and transmit the generated packets or cells to the destination unit address which is stored in the packet data or cell data received from the network.

The above objects can also be accomplished by a multimedia communications apparatus for being connected to a packet or cell network and an AV device or a multimedia computer which handles multimedia including moving-image and sound data. The multimedia communications apparatus comprises a control interface for transmitting an AV device control signal to and receiving an AV device control signal from the AV device or the multimedia computer which is connected, a video/audio interface for transmitting moving-image data or sound data to and receiving moving-image data or sound data from the AV device or the multimedia computer, a packet generator/separator for generating packets or cells based on data received from the control interface and the video/audio interface, and separating packets or cells received from the network and transmitting the packets or the cells to the control interface and the video/audio interface, a table for storing data representative of the correspondence between an identifier of the AV device or the multimedia computer and an address thereof on the network connected to AV device or the multimedia computer, and control means for controlling the packet generator/separator to generate packets or cells from data which are received from the AV device or the multimedia computer and which specify a unit with which to communicate with the identifier of the AV device or the multimedia computer, and transmit the generated packets or cells to the address on the network which is determined from the table by the identifier.

The above objects can further be accomplished by a multimedia communications apparatus for being connected to a cell network and an AV device or a multimedia computer which handles multimedia including moving-image and sound data. The multimedia communications apparatus comprises cell assembling/disassembling means having a control interface for transmitting an AV device control signal to and receiving an AV device control signal from the AV device or the multimedia computer which is connected, a video/audio interface for transmitting moving-image data or sound data to and receiving moving-image data or sound data from the AV device or the multimedia computer, a packet generator for generating ATM cells based on data received from the control interface and the video/audio interface and separating received ATM cells and transmitting the ATM cells to the control interface and the video/audio interface, and a control signal table for storing data representing the correspondence between addresses of the AV device or the multimedia computer as originating and destination units and communication paths, and an ATM switcher having an ATM cross-connector for exchanging the ATM cells and an ATM cross-connect table for storing data representative of the correspondence between communication paths with the cell assembling/disassembling means and communication paths with other multimedia communications apparatus.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a diagram showing the contents of information contained in a table in the multimedia communications apparatus;

FIG. 4 is a block diagram of a multimedia communications network which incorporates multimedia communications apparatus according to the present invention;

FIG. 5 is a block diagram of a multimedia ATM communications apparatus according to the present invention;

FIG. 6 is a diagram of a standard format for ATM cells;

FIG. 8 is a diagram showing the contents of information stored in a control signal table in a first cell assembling/disassembling device;

FIG. 9 is a diagram showing the contents of information stored in a control signal table in a second cell assembling/disassembling device;

FIG. 10 is a diagram showing the contents of information stored in a control signal table in a third cell assembling/disassembling device;

FIG. 11 is a diagram showing the contents of information stored in an ATM cross-connect table in a first ATM switcher;

FIG. 12 is a diagram showing the contents of information stored in an ATM cross-connect table in a second ATM switcher;

FIG. 13 is a diagram showing the contents of information stored in an ATM cross-connect table in a third ATM switcher;

DETAILED DESCRIPTION OF THE PREFERRED EMBODIMENTS

The principles of a multimedia communications apparatus according to the present invention will be described below with reference to FIG. 1.

Figure 1:
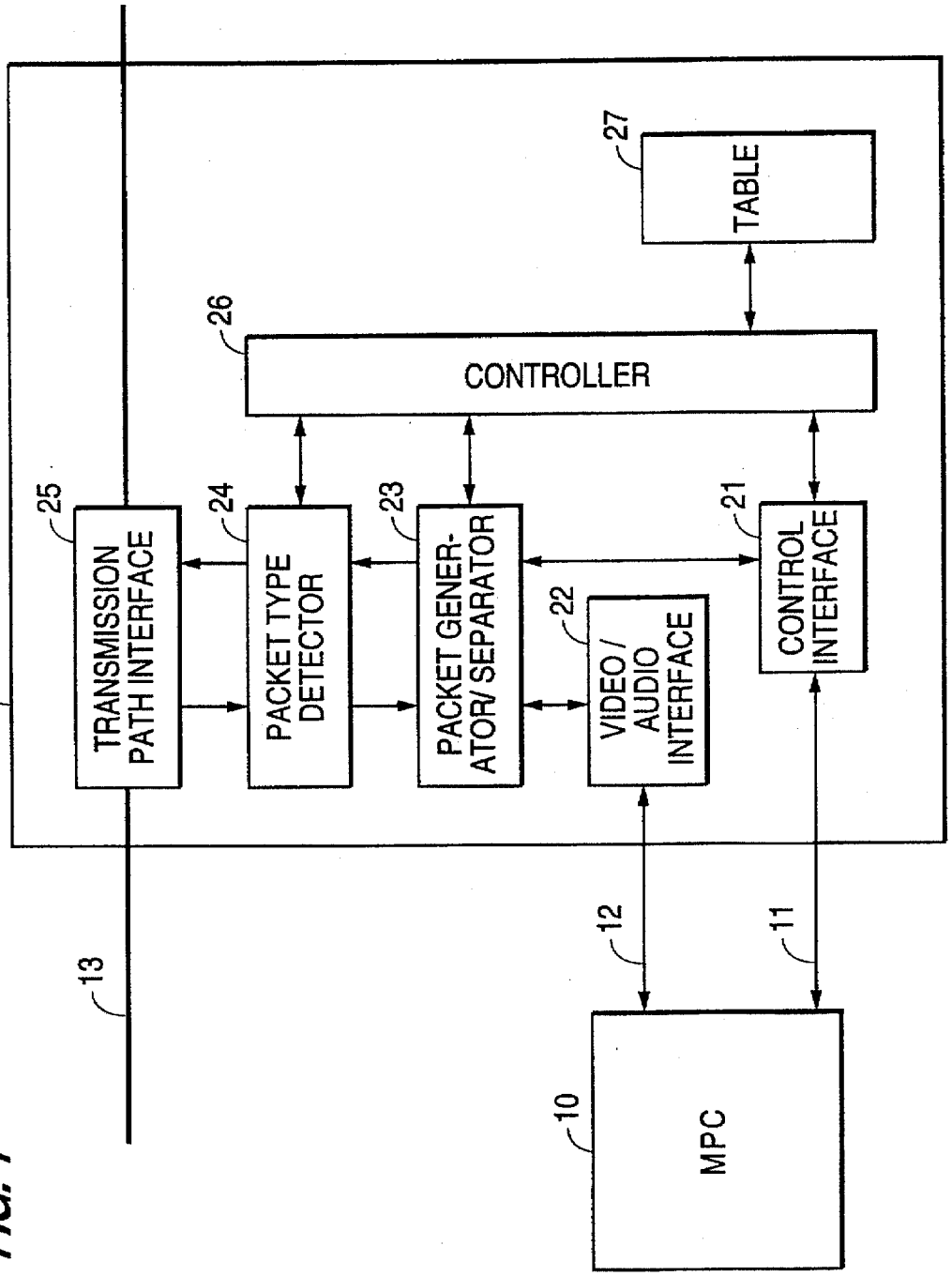
FIG. 1 is a block diagram showing the principles of a multimedia communications apparatus according to the present invention.

As shown in FIG. 1, a multimedia personal computer (MPC) 10 is connected to a multimedia communications apparatus 20 which is connected to a packet or cell network. The multimedia communications apparatus 20 has a control interface 21 connected to the multimedia personal computer 10 through a control signal line 11, a video/audio interface 22 connected to the multimedia personal computer 10 through a video/audio signal line 12, and a packet generator/separator 23 for generating packets to be transmitted over the network based on data received from the control interface 21 and the video/audio interface 22, and separating packets received from another multimedia communications apparatus and transmitting the separated packets to the control interface 21 and the video/audio interface 22.

The multimedia communications apparatus 20 also has a packet type detector 24 for detecting the slot type of the network that flows in from a transmission path 13, which is preferably in the form of a slotted-ring LAN, capturing an empty slot, and sending the slot to the packet generator/separator 23 if the slot is addressed to the multimedia communications apparatus 20, a transmission path interface 25 for interfacing with the transmission path 13, a controller 26 for controlling the multimedia communications apparatus 20 in its entirety, and a table 27 which stores data representing the correspondence between addresses of the interfaces of the multimedia personal computer 10 and the AV devices and addresses on the network.

Operation of the multimedia communications apparatus 20 shown in FIG. 1 will be described below. For the multimedia personal computer 10 to transmit moving-image data, the multimedia personal computer 10 sends a moving-image communication request over the control signal line 11 to the control interface 21. The control interface 21 then sends the moving-image communication request, the address of the originating unit, and the address of a destination unit to the controller 26. The controller 26 instructs the packet type detector 24 to keep a packet for moving-image data. The packet type detector 24 confirms a slot flowing in from the transmission path 13 and captures an empty slot needed to transfer moving-image data.

The multimedia personal computer 10 transmits the address of the destination unit to the control interface 21 over the control signal line 11, and transmits the moving-image data to the video/audio interface 22 over the video/audio signal line 12. The control interface 21 and the video/audio interface 22 deliver the information received from the multimedia personal computer 10 to the packet generator/separator 23.

The packet generator/separator 23 asks the controller 26 about the address of the multimedia communications apparatus of the destination unit, to which a multimedia personal computer, for example, is connected. The controllers 26 refers to the table 27 to obtain the address of the multimedia communications apparatus of the destination unit, and transfers the obtained address to the packet generator/separator 23. The packet generator/separator 23 writes the obtained address and the moving-image data in the packet. To the packet generated by the packet generator/separator 23, there is added a signal indicating that the packet is a packet in use, by the packet type detector 24. The packet is then transmitted through the transmission path interface 25 to the transmission path 13.

At the receiving unit, the slot flowing in from the transmission path 13 is captured by the packet type detector 24, which detects the address of the originating unit. If the detected address is directed to the multimedia communication apparatus of the receiving unit, then the packet type detector 24 captures and sends the packet to the packet generator/separator 23. If the detected address is not directed to the multimedia communication apparatus of the receiving unit, then the packet type detector 24 returns the packet to the transmission path 13. The packet generator/separator 23 separates the received packet into the moving-image data and the control signal, and delivers the moving-image data and the control signal respectively through the video/audio interface 22 and the control interface 21 to the multimedia personal computer, for example, of the destination unit.

While the multimedia personal computers are connected to the multimedia communications apparatus 20 at the originating and destination units in the above arrangement, an AV device such as a laser disc player, a video tape recorder, a video camera, or the like may be connected to the multimedia communications apparatus 20.

For the multimedia personal computer 10 to access an AV device, VISCA (Video System Control Architecture) (trademark owned by Sony Corporation) established by Sony Corporation may be used as a protocol for controlling the AV device from the multimedia personal computer 10. The VISCA is a set of interface standards between a personal computer and an AV device such as a laser disc player, a video tape recorder, or the like which is connected to the personal computer, for sending a fast-feed command, a rewind command, or the like from the personal computer to the AV device, and sending a command to extract a certain video image from the personal computer to the AV device, which transmits the corresponding video image to the personal computer. Since the frame format of VISCA includes the concepts of the addresses of originating and destination units, the VISCA is able to give address-free AV devices addresses on a network, thereby making it possible to control a plurality of AV devices connected to a personal computer.

FIG. 2 shows the contents of information stored in the table 27 in the multimedia communications apparatus 20.

As shown in FIG. 2, the table 27 stores node addresses 27a indicative of apparatus numbers of the multimedia communications apparatus 20, channel addresses 27b indicative of channel numbers of the multimedia communications apparatus 20, VISCA addresses 27c indicative of devices connected to the channels according to the VISCA protocol, interface types 27d for interfacing with the network, and communication rates 27e. The stored information is managed in the single table 27 by the multimedia communications apparatus 20.

Figure 3:
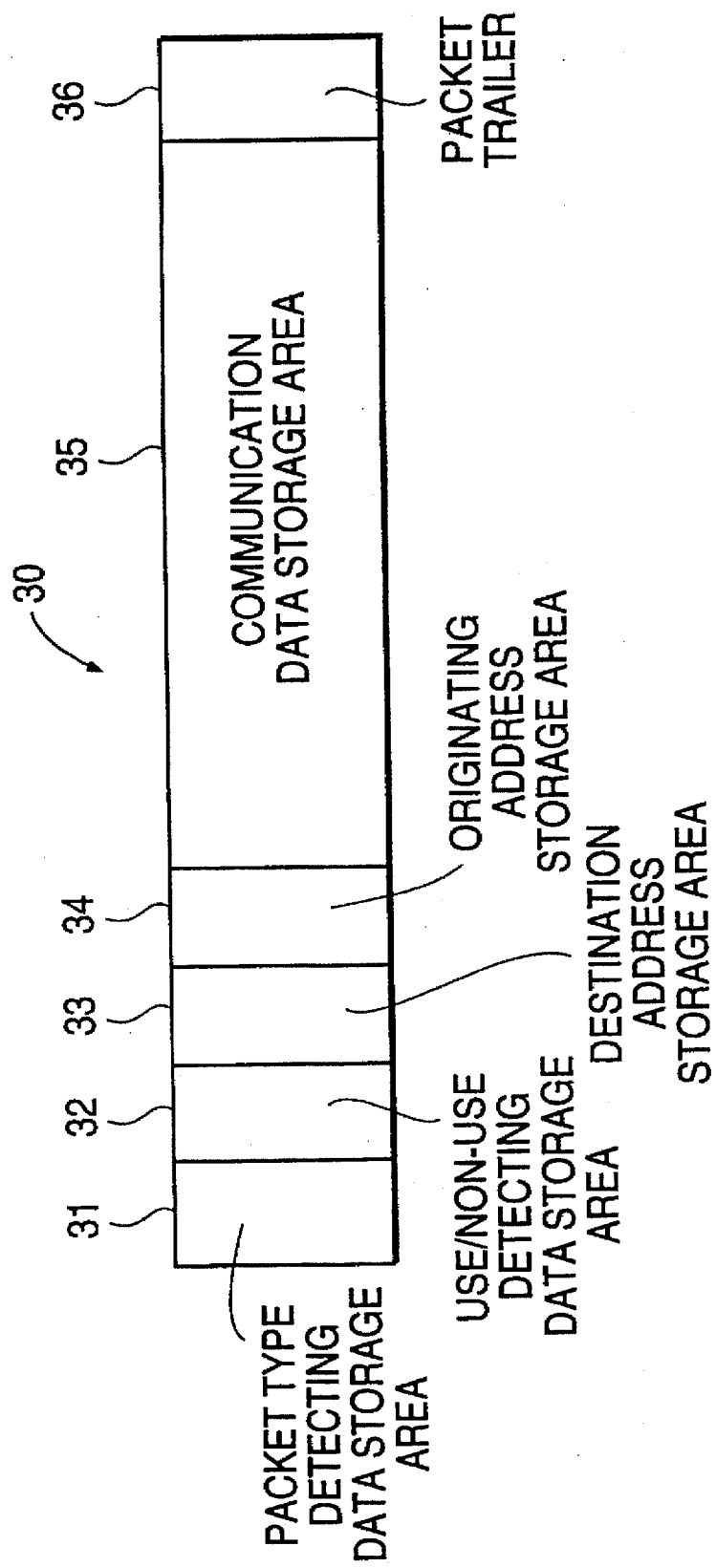
FIG. 3 is a diagram showing a packet format used by the multimedia communications apparatus.

FIG. 3 shows a packet format used by the multimedia communications apparatus 20. In the multimedia communications apparatus 20, a packet 30 has a packet type detecting data storage area 31 which stores data representative of the type of information in a packet, i.e., numerical data representing whether the media are moving-image data, sound data, or data such as of a VISCA command. The packet 30 also has a use/non-use detecting data storage area 32 which stores data representative of whether the packet 30 is in use or not in use, a destination address storage area 33 which stores the address of the multimedia communications apparatus of a destination unit to which the packet 30 is to be transmitted, and an originating address storage area 34 which stores the address of the multimedia communications apparatus of an originating unit from which the packet 30 is transmitted. The packet type detecting data storage area 31, the use/non-use detecting data storage area 32, the destination address storage area 33, and the originating address storage area 34 serve as a header of the packet 30. The packet 30 further includes a communication data storage area 35 which stores actual data to be communicated, and a packet trailer 36 which stores data representing the end of the packet 30 by adding a control signal for error detection or the like to the packet 30. The use/non-use detecting data storage area 32 of every slot contained in the slotted ring is initialized to the not-in-use (or empty) state. When a node wishes to send data to another node, it waits until an empty slot is detected. The sending node uses the captured slot to transmit a packet, putting the header information and communication data into their respective areas (or fields) and setting an in-use (or full) state to the use/non-use detecting data storage area 32. The sending node will reset the use/non-use detecting data storage area 32 to the initial state when the packet circulates the ring and returns to the sending node.

FIG. 4 shows a multimedia communications network which incorporates multimedia communications apparatus according to the present invention.

As shown in FIG. 4, the multimedia communications network comprises a loop LAN composed of four multimedia communications apparatus 201, 202, 203, 204. A laser disc player (LDP) 101 is connected to the multimedia communications apparatus 201. A video tape recorder (VTR) 102 is connected to the multimedia communications apparatus 202. A video camera 103 is connected to the multimedia communications apparatus 203. A multimedia personal computer 104 is connected to the multimedia communications apparatus 204. Each of the multimedia communications apparatus 201, 202, 203, 204 has two channels "1", "2", with a video/audio signal line 12 connected to the channel "1" and a control signal line 11 to the channel "2".

Signal converters 111, 112, 113 are connected to the respective signal lines 11 to which the laser disc player 101, the video tape recorder 102, and the video camera 103 are connected. The signal converters 111, 112, 113 may comprise a Vbox (trademark owned by Sony Corporation), for example. AV devices usually have only infrared remote control units as external control means, and a personal computer cannot directly be connected to such infrared remote control units. The Vbox can convert VISCA commands from a personal computer into signals called "Control-S" which are the same as signals of infrared remote control units and can be transmitted over wires. Some recent video tape recorders have a built-in Vbox function which allows them to be directly connected to a personal computer not via a Vbox.

The AV devices that are controlled by the multimedia personal computer 104 are assigned respective addresses that are successively "1", "2", "3" in the order away from the multimedia personal computer 104 which serves as a controller. The address of the multimedia personal computer 104 itself is fixed to "0". In the illustrated loop LAN configuration, the AV devices are assigned respective addresses successively clockwise from the multimedia personal computer 104, i.e., the address of the laser disc player 101 set to a VISCA address "1", the address of the video tape recorder 102 to a VISCA address "2", and the address of the video camera 103 to a VISCA address "3".

A sequence of operation for controlling the laser disc player 101 from the multimedia personal computer 104 to obtain a desired video signal from the laser disc player 101 will be described below.

In order to confirm a desired image, the multimedia personal computer 104 transmits a PLAY command "81 01 02 01 28 FF" to the laser disc player 101 which has the VISCA address "1". The PLAY command "81 01 02 01 28 FF" contains a command from the VISCA address "0" to the VISCA address "1", a command message, a play command, and a symbol indicative of a terminator. In response to such a VISCA command from the multimedia personal computer 104, the channel "2" of the multimedia communications apparatus 204 refers to the table 27 (see FIG. 2) therein, and starts setting a logic path "1" indicated by the solid line in FIG. 4. Specifically, in the table 27, the node address "4"/the channel address "2"/the interface type "RS232C" which indicate the multimedia communications apparatus 204 are determined as representing an originating unit from the VISCA address "0" and the communication rate "9600 bps" for VISCA commands, which indicate the multimedia personal computer 104, and the node address "1"/the channel address "2"/the interface type "RS232C" are determined as representing a destination unit from the VISCA address "1" and the communication rate "9600 bps" for VISCA commands, which indicate the laser disc player 101. The logic path "1" passing through these devices is then established.

The packet type detector 24 in the multimedia communications apparatus 204 starts capturing an empty slot for transfer at 9600 bps. The captured packet is delivered to the packet generator/separator 23 in which the destination unit address in the destination address storage area of the packet are updated based on the established logic path and the VISCA command is inserted in the communication data storage area of the packet. Then, the packet is transmitted over the transmission path.

In the multimedia communication apparatus 201, the packet addressed to the node address "1" is read in, and the VISCA command is extracted from the communication data storage area of the packet by the packet generator/separator 23. The VISCA command is delivered through the channel "2" to the signal converter 111. The signal converter 111 decodes the VISCA command, and if it recognizes that the VISCA command is a PLAY command for the laser disc player 101, then the converter 111 returns the VISCA message (an acknowledgment of the PLAY command: ACK) "90 41 FF" to the multimedia communication apparatus 201.

In response to the message of the acknowledgment of the PLAY command from the signal converter 111, the controller 26 in the multimedia communication apparatus 201 refers to the table 27 to establish a logic path "2" indicated by the broken line in FIG. 4 in preparation for video data communications. Specifically, the node address "1"/the channel address "1"/the interface type "NTSC" are determined as representing an originating unit, and the node address "4"/the channel address "1"/the interface type "NTSC" are determined as representing a destination unit. The logic path "2" with the number of slots necessary for video data communications being 45 Mbps is now established.

The packet type detector 24 in the multimedia communication apparatus 201 captures an empty packet for transfer at 45 Mbps. If the controller 26 in the multimedia communication apparatus 201 determines that an empty packet can be captured by the packet type detector 24, then the controller 26 transmits the VISCA message (the message of the acknowledgment of the PLAY command) to the multimedia communications apparatus 204 via the logic path "2".

The signal converter 111 converts the VISCA command into a Control-S signal, and delivers the Control-S signal to the laser disc player 101. In response to the Control-S signal, the laser disc player 101 starts playing back a layer disc. A reproduced video signal from the laser disc player 101 is transmitted through the NTSC interface to the logic path "2"

from the multimedia communication apparatus 201/channel address "1" to the multimedia communication apparatus 204.

The multimedia personal computer 104 receives the video signal from the laser disc player 101 through the channel "1" of the multimedia communication apparatus 204.

In necessary, after the received video signal has been processed by the multimedia personal computer 104, the VISCA command may be issued to the video tape recorder 102, and the multimedia communication apparatus 204 may refer to the table to establish a logic path corresponding to the VISCA address, write the logic path in the header of a packet, transmit the packet with the processed video signal to the video tape recorder 102 where it may be recorded.

Operation of the multimedia communications network in case the packet type detector 24 in the multimedia communication apparatus 201 is unable to capture an empty slot for transfer at 45 Mbps will be described below.

The packet type detector 24 in the multimedia communication apparatus 201 starts capturing an empty slot for transfer at 45 Mbps after a logic path has been established. If the packet type detector 24 determines that it is unable to capture an empty slot within a certain period of time, then the controller 26 changes the VISCA message from "the message of the acknowledgment of the PLAY command" to an error message "90 61 41 FF", and sends the error message to the multimedia personal computer 104 via the logic path "1". The multimedia personal computer 104 can now recognize that a timeout error has occurred in the multimedia communication apparatus 201.

Operation of the multimedia communications network in case a STOP command is issued from the multimedia personal computer 104 to the laser disc player 101 will be described below.

The multimedia personal computer 104 transmits a STOP command "81 01 02 01 00 FF" to the laser disc player 101. When the multimedia communication apparatus 204 receives the STOP command, the multimedia communication apparatus 204 transmits the STOP command through the multimedia communication apparatus 201 to the signal converter 111 via the logic path "1". The signal converter 111 transmits a Control-S signal corresponding to the STOP command to the laser disc player 101, causing the laser disc player 101 to stop reproducing the video signal. When the laser disc player 101 stops reproducing the video signal, the signal converter 111 sends a completion message "90 51 FF" indicative of the completion of the STOP command to the multimedia communication apparatus 201. Then, the multimedia communication apparatus 201 transmits the completion message to the multimedia communication apparatus 204 via the logic path "1". At the same time, the packet type detector 24 in the multimedia communication apparatus 201 changes the data in the use/non-use detecting data storage area of the packet used in the logic path "2" to data indicative of non-use, thereby releasing the packet from the dedicated state.

Having received the completion message indicative of the completion of the STOP command, the multimedia communications apparatus 204 sends the completion message to the multimedia personal computer 104, and changes the data in the use/non-use detecting data storage area of the packet used in the logic path "1" to data indicative of non-use, thereby releasing the packet.

Logic paths only between the multimedia communications apparatus and the multimedia personal computer 104 are shown being set in the table that is used by the multimedia personal computer 104. However, logic paths for all patterns to connect AV devices may be set in the table to allow the multimedia personal computer 104 to instruct an AV device to transmit signals between AV devices. For example, the multimedia personal computer 104 may instruct the laser disc player 101 to transmit a reproduced video signal to the video tape recorder 102 for recording the video signal on a video tape in the video tape recorder 102.

FIG. 5 illustrates a multimedia ATM communications apparatus according to the present invention.

As shown in FIG. 5, the multimedia ATM communications apparatus generally comprises a cell assembling/disassembling (CLAD) device 40 and an ATM switcher 50. The cell assembling/disassembling device 40 comprises a control interface 42 connected to a multimedia personal computer 10 through a control signal line 11 which transmits a VISCA command, a video/audio interface 42 connected to the personal computer 10 through a video/audio signal line 12 which transmits a video/audio signal, an ATM cell generator 43 for generating ATM cells, an ATM interface 44 for connecting the cell assembling/disassembling device 40 to the ATM switcher 50, a controller 45 for controlling the cell assembling/disassembling device 40 in its entirety, and a control signal table 46 which stores data representative of the correspondence between VISCA addresses of the multimedia personal computer 10 and AV devices and virtual communications lines. The cell assembling/disassembling device 40 has a function to convert a video signal into an ATM interface signal, and the ATM switcher 50 actually effects signal switching.

The ATM switcher 50 comprises an ATM interface 51a which is connected to the ATM interface 44 of the cell assembling/disassembling device 40 through an ATM transmission path 13a, ATM interfaces 51b, 51c connected to other ATM communication apparatus through respective ATM transmission paths 13b, 13c, an ATM cross-connector 52, and an ATM cross-connect table 53 which stores data representative of the correspondence between the virtual communications lines of the ATM communications apparatus.

FIG. 6 shows a standard format for ATM cells.

As shown in FIG. 6, an ATM cell 60 is composed of a generic flow control (GFC) signal 61 which serves as a control signal for preventing cells from colliding with each other, a virtual path identifier (VPI) 62 for identifying a thicker virtual path among virtual communication lines used for ATM communications, a virtual channel identifier (VCI) 63 for identifying a virtual channel actually used in the virtual path for communications, a payload type (PT) signal 64 for identifying whether the information to be transmitted is user information or control information, a cell loss priority (CLP) signal 65 for use in priority control for cells, a header error control (HEC) signal 66 for detecting an error in a header which is composed of the signals 61–65 and achieving cell synchronism, and an information field 67 which stores user information such as a video signal or a VISCA command.

Figure 7:
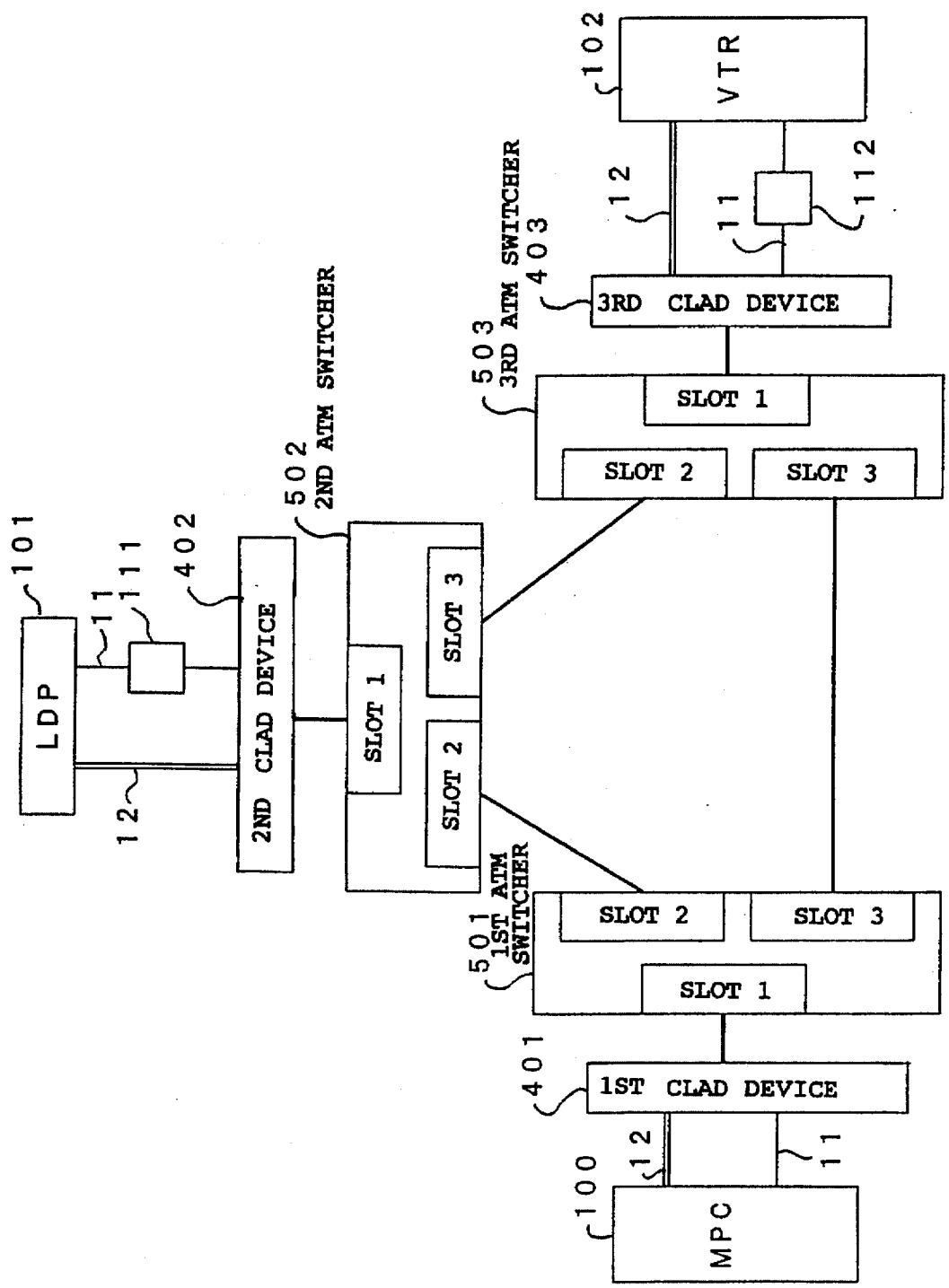
FIG. 7 is a block diagram of a multimedia communications network which incorporates ATM communications apparatus.
Figure 14:
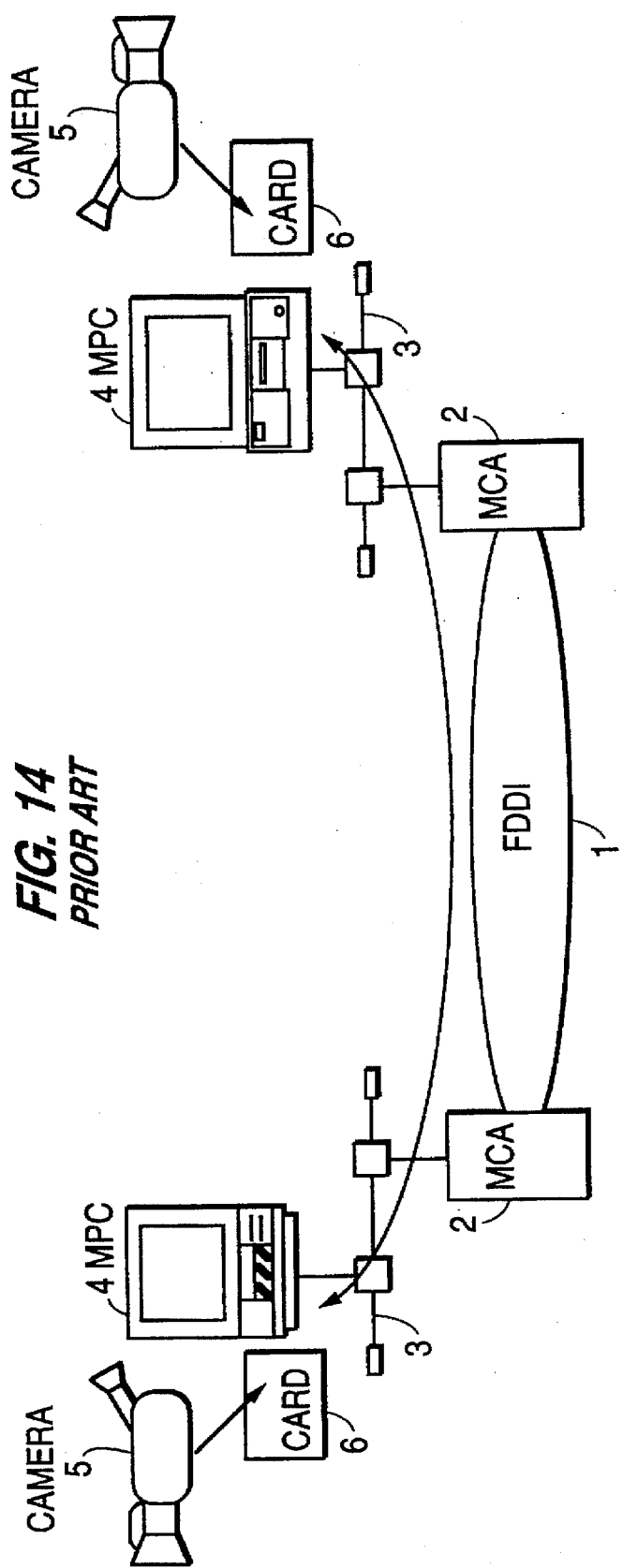
FIG. 14 is a diagram showing a conventional multimedia communications network.
Figure 15:
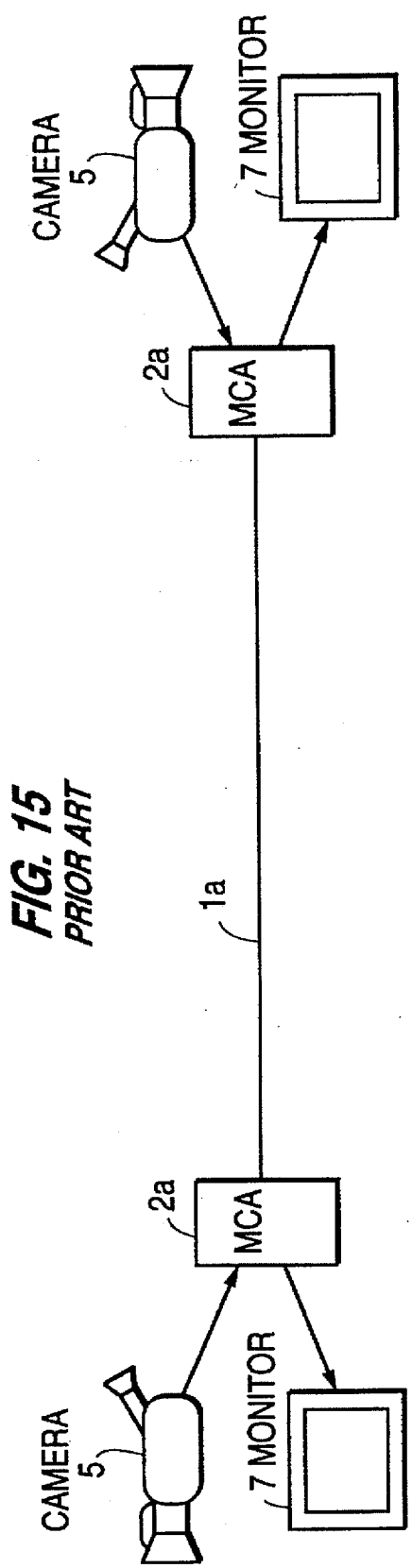
FIG. 15 is a diagram showing another conventional multimedia communications network.

FIG. 7 shows a multimedia communications network which incorporates ATM communications apparatus.

As shown in FIG. 7, the multimedia communications network comprises three ATM communications apparatus which interconnect a multimedia personal computer (MPC) 100, a laser disc player (LDP) 101, and a video tape recorder (VTR) 102.

The multimedia personal computer 100 is connected to a first cell assembling/disassembling device 401 through a control signal line 11 and a video/audio signal line 12. The first cell assembling/disassembling device 401 is connected to an ATM interface mounted in a slot "1" of a first ATM switcher 501. Similarly, the laser disc player 101 and the video tape recorder 102 are connected respectively to second and third cell assembling/disassembling devices 402, 403 through control signal lines 11 and video/audio signal lines 12, the control signal lines 11 being connected to respective signal converters 111, 112 each comprising a Vbox. The second and third cell assembling/disassembling devices 402, 403 are connected to respective ATM interfaces mounted in slots "1" of second and third ATM switchers 502, 503. The first, second, and third ATM switchers 501, 502, 503 have other slots "2", "3" in which ATM interfaces are mounted. The slot "2" of the first ATM switcher 501 is connected to the slot "2" of the second ATM switcher 502. The slot "3" of the second ATM switcher 502 is connected to the slot "2" of the third ATM switcher 503. The slot "3" of the third ATM switcher 503 is connected to the slot "3" of the first ATM switcher 501.

Between the multimedia personal computer 100 and the first cell assembling/disassembling device 401, a VISCA command is transmitted over the control signal line 11 and a video signal such as a moving-image signal is transmitted over the video/audio signal line 12. Between the laser disc player 101 and the second cell assembling/disassembling device 402, a Control-S signal is transmitted over the control signal line 11 between the laser disc player 101 and the signal converter 111, and a VISCA command is transmitted over the control signal line 11 between the signal converter 111 and the second cell assembling/disassembling device 402. Between the video tape recorder 102 and the third cell assembling/disassembling device 403, a Control-S signal is transmitted over the control signal line 11 between the video tape recorder 102 and the signal converter 112, and a VISCA command is transmitted over the control signal line 11 between the signal converter 112 and the third cell assembling/disassembling device 403. The address of the multimedia personal computer 100 is set to a VISCA address "0", the address of the signal converter 111 for the laser disc player 101 is set to a VISCA address "1", and the address of the signal converter 112 for the video tape recorder 102 is set to a VISCA address "2".

Operation of the ATM communications apparatus will be described below. The ATM communications apparatus are controlled based on the contents of information stored in control signal tables in the cell assembling/disassembling devices and the contents of information stored in ATM cross-connect tables in the ATM switchers. The contents of information stored in the tables in the ATM communications apparatus will first be described below.

FIG. 8 shows the contents of information stored in the control signal table in the first cell assembling/disassembling device 401. FIG. 9 shows the contents of information stored in the control signal table in the second cell assembling/disassembling device 402. FIG. 10 shows the contents of information stored in the control signal table in the third cell assembling/disassembling device 403.

As shown in FIGS. 8 through 10, the first, second, and third cell assembling/disassembling devices 401, 402, 403 have respective control signal tables 461, 462, 463 which store respective originating unit addresses 461a, 462a, 463a, respective destination unit addresses 461b, 462b, 463b, respective virtual path identifiers (VPI) 461c, 462c, 463c, respective virtual channel identifiers (VCI) 461d, 462d, 463d, transmission bands 461e, 462e, 463e, and signal types 461f, 462f, 463f indicative of whether the signal to be transmitted is a VISCA command or a video signal.

For communications from the multimedia personal computer 100 to the laser disc player 101, the control signal table 461 in the first cell assembling/disassembling device 401 shown in FIG. 8 is referred to. Since the multimedia personal computer 100 as an originating unit has a VISCA address "0" and the laser disc player 101 as a destination unit has a VISCA address "1", it can be seen from the address of the originating unit, the address of the destination unit, and the type of the signal to be transmitted that the communications line between the multimedia personal computer 100 and the ATM switcher is VPI=10, VCI=1 if the signal is a VISCA command, and VPI=10, VCI=2 if the signal is a video signal. Similarly, it can be seen that the communications line between the second cell assembling/disassembling device 402 and the laser disc player 101 is VPI=20, VCI=5 if the signal is a VISCA command, and VPI=20, VCI=6 if the signal is a video signal, by referring to the control signal table 462 shown in FIG. 9 where the originating unit address is a VISCA address "0" and the destination unit address is a VISCA address "1".

Since the communication lines for the ATM communications apparatus are defined with respect to the individual ATM communications apparatus, rather than the entire network, the first and second ATM switchers, for example, may have the same numbers for VCI and VPI. To avoid confusion, the VCI and VPI in the control signal tables are set to different numbers in the illustrated examples.

FIG. 11 shows the contents of information stored in an ATM cross-connect table in the first ATM switcher 501. FIG. 12 shows the contents of information stored in an ATM cross-connect table in the second ATM switcher 502. FIG. 13 shows the contents of information stored in an ATM cross-connect table in the third ATM switcher 503.

As shown in FIGS. 11 through 13, the first, second, and third ATM switchers 501, 502, 503 have respective ATM cross-connect tables 531, 532, 533 which store respective transmission direction signals 531a, 532a, 533a indicative of directions of transmission between the cell assembling/disassembling devices, respective ATM transmission path (for reception) signals 531b, 532b, 533b indicative of which slot is used to receive the signal in, respective virtual path identifiers (VPI) 531c, 532c, 533c indicative of virtual paths between the cell assembling/disassembling devices and the ATM switchers for reception, respective virtual channel identifiers (VCI) 531d, 532d, 533d indicative of virtual channels between the cell assembling/disassembling devices and the ATM switchers for reception, respective ATM transmission path (for transmission) signals 531e, 532e, 533e indicative of which slot is used to transmit the signal from, respective virtual path identifiers (VPI) 531f, 532f, 533f indicative of virtual paths between the ATM switchers and the cell assembling/disassembling devices for transmission, respective virtual channel identifiers (VCI) 531g, 532g, 533g indicative of virtual channels between the ATM switchers and the cell assembling/disassembling devices for transmission, and transmission bands 531h, 532h, 533h.

Communications from the multimedia personal computer 100 to the laser disc player 101 are communications from the first cell assembling/disassembling device 401 to the second cell assembling/disassembling device 402 as viewed from the cell assembling/disassembling devices. For such communications, the ATM cross-connect table 531 in the first ATM switcher 501 shown in FIG. 11 is referred to. The first ATM switcher 501 receives the signal from the first cell assembling/disassembling device 401 in the slot "1" and transmits the signal from the slot "2". It can be seen from FIG. 11 that the communication line for reception is VPI=10, VCI=1 if the signal is a VISCA command, and VPI=10, VCI=2 if the signal is a video signal, and the communication line for transmission is VPI=12, VCI=1 if the signal is a VISCA command, and VPI=12, VCI=2 if the signal is a video signal. Then, the ATM cross-connect table 532 in the second ATM switcher 502 shown in FIG. 12 is referred to. In the ATM cross-connect table 532, the transmission direction from the first cell assembling/disassembling device to the second cell assembling/disassembling device is referred to. The signal from the first ATM switcher 501 to the second ATM switcher 502 is received in the slot "2" and transmitted from the slot "1" to the second cell assembling/ disassembling device 402. It can be seen from FIG. 12 that the communication line for reception is VPI=12, VCI=1 if the signal is a VISCA command, and VPI=12, VCI=2 if the signal is a video signal, and the communication line for transmission is VPI=20, VCI=5 if the signal is a VISCA command, and VPI=20, VCI=6 if the signal is a video signal.

A sequence of operation for controlling the laser disc player 101 and the video tape recorder 102 from the multimedia personal computer 100 to record a video signal obtained from the laser disc player 101 on a video tape in the video tape recorder 102 will be described below.

In order to confirm a desired image, the multimedia personal computer 100 transmits a PLAY command "81 01 02 01 28 FF" according to VISCA to the laser disc player 101. The PLAY command "81 01 02 01 28 FF" contains a command from the VISCA address "0" to the VISCA address "1", a command message, a play command, and a symbol indicative of a terminator. When the control interface in the first cell assembling/disassembling device 401 receives such a VISCA command from the multimedia personal computer 100, the controller thereof refers to the control signal table 461 shown in FIG. 8, recognizes that the transmission of a VISCA command from the VISCA address "0" to the VISCA address "1" uses a virtual path of VPI=10, VCI=1 as a communications line for communication with the first ATM switcher 501, and transfers the VISCA command to the ATM cell generator.

In the case of a PVC (Permanent Virtual Connection) in which communications paths required for communications are allocated in advance, the ATM cell generator writes "10", "1" respectively in VIP, VCI of an ATM cell that has been maintained, places the VISCA command in the information field of the ATM cell, and sends the ATM cell through the ATM interface to the slot "1" of the first ATM switcher 501.

Since the first ATM switcher 501 receives the ATM cell over the communications line of VIP="10", VCI="1" in the slot "1", the first ATM switcher 501 recognizes that the communications line for transmission is VPI="12", VCI= "1" from the ATM cross-connect table 531 shown in FIG. 11, rewrites VPI, VCI of the ATM cell, and delivers the ATM cell from the slot "2" of the first ATM switcher 501 to the slot "2" of the second ATM switcher 502.

The second ATM switcher 502 refers to its own ATM cross-connect table 532 shown in FIG. 12, recognizes that the communications line for transmission, which corresponds to VPI=12, VCI=1 of the communications lines from which the ATM cell has been received, is VPI="20", VCI= "5", rewrites VPI, VCI of the ATM cell, and delivers the ATM cell from the slot "1" of the second ATM switcher 502 to the second cell assembling/disassembling device 402.

In the second cell assembling/disassembling device 402, the ATM cell generator extracts the VISCA command from the information field of the ATM cell. The second cell assembling/disassembling device 402 sends the extracted VISCA command through the control interface to the signal converter 111. The signal converter 111 converts the contents of the VISCA command into a signal (Control-S) that can be understood by the laser disc player 101, and sends the signal to the laser disc player 101. In response to the PLAY command, the laser disc player 101 starts playing back a laser disc. When the signal converter 111 receives the VISCA command, the signal converter 111 sends a VISCA message (an acknowledgment of the PLAY command) "91 41 FF" back over the same route to the multimedia personal computer 100 that has the originating unit VISCA address "0".

Because of the acknowledgment from the signal converter 111, the second cell assembling/disassembling device 402 recognizes that the signal converter 111 has received the PLAY command, and prepares itself for the transmission of a moving-image signal from the laser disc player 101. Now, video information is transmitted from the second cell assembling/disassembling device 402 to the first cell assembling/disassembling device 401. When a video signal transmitted from the laser disc player 101 is supplied over the video/audio signal line 12 to the video/audio interface of the second cell assembling/disassembling device 402, the controller thereof refers to the control signal table 462 (see FIG. 9) in the second cell assembling/disassembling device 402, and recognizes that the communications line of VPI= 20, VCI=2 may be used in order to send a video signal that requires a transmission band of 10 Mbps from the VISCA address "1" to the VISCA address "0" which has returned the VISCA message. The cell generator writes the path in an ATM cell that has been maintained, places moving-image data in its information field, and transmits the ATM cell to the second ATM switcher 502.

The second ATM switcher 502 refers to its own ATM cross-connect table 532 shown in FIG. 12, and transmits the ATM cell of VPI=20, VCI=2, which has been received in the slot "1", from the slot "2" to the first ATM switcher 501 over the communications line of VPI=12, VCI=4.

The first ATM switcher 501 refers to its own ATM cross-connect table 531 shown in FIG. 11, and transmits the ATM cell of VPI=12, VCI=4, which has been received in the slot "2", from the slot "1" to the first cell assembling/ disassembling device 401 over the communications line of VPI=10, VCI=6.

The first cell assembling/disassembling device 401 extracts the moving-image data from the ATM cell which has been received from the first ATM switcher 501, and transmits the moving-image data via the video/audio interface to the multimedia personal computer 100. The multimedia personal computer 100 can now monitor the moving-image data that have been reproduced by the laser disc player 101.

Thereafter, the multimedia personal computer 100 transmits a VISCA command "92 01 02 01 48 FF" to the signal converter 112 having a VISCA address "2" in the same manner as described above, for enabling the video tape recorder 102 to record the moving-image data. The VISCA command "92 01 02 01 48 FF" is transmitted through the first cell assembling/disassembling device 401, the first ATM switcher 501, the third ATM switcher 503, and the third cell assembling/disassembling device 403 to the signal converter 112, which converts the VISCA command into a Control-S signal that is delivered to the video tape recorder 102. In response to the Control-S signal, the video tape recorder 102 is now rendered capable of recording the moving-image data.

Then, the network operates to transmit the reproduced moving-image data from the laser disc player 101 to the video tape recorder 102. First, the multimedia personal computer 100 issues a VISCA command "A1 01 02 01 28 FF", which is a PLAY command from the VISCA address "2" to the VISCA address "1", to the laser disc player 101. The VISCA command "A1 01 02 01 28 FF" is transmitted through the first cell assembling/disassembling device 401 (VPI/VCI=10/1), the first ATM switcher 501 (VPI/VCI=12/1), the second ATM switcher 502 (VPI/VCI=20/5), and the second cell assembling/disassembling device 402 to the signal converter 111. The signal converter 111 converts the VISCA command into a Control-S signal, transmits the Control-S signal to the laser disc player 101, and sends an acknowledgment of the PLAY command to the originating unit. At this time, the signal converter 111 recognizes the originating unit with the address written at the beginning of the VISCA command. Specifically, "A1" at the beginning of the VISCA command indicates the VISCA address "2" of the originating unit and the VISCA address "1" of the destination unit, and the signal converter 111 recognizes that the originating unit has the VISCA address "2" and transmits a VISCA message (an acknowledgment of the PLAY command) "92 41 FF" to the signal converter 112 having the VISCA address "2". At the same time, the signal converter 111 prepares itself for transmitting the moving-image data to the units to which the VISCA message has been transmitted.

The second cell assembling/disassembling device 402 transmits the VISCA message through the second switcher 502 to the third ATM switcher 503 and the third cell assembling/disassembling device 403 to which the signal converter 112 having the VISCA address "2" is connected, and transmits the moving-image data from the laser disc player 101 to the units to which the VISCA message has been transmitted, i.e., the third switcher 503 and the third cell assembling/disassembling device 403. The third cell assembling/disassembling device 403 sends the received moving-image data to the video tape recorder 102, which records the moving-image data on a video tape. At this time, since the communications path between the laser disc player 101 and the multimedia personal computer 100 is active, the multimedia personal computer 100 is capable of continuously monitoring the reproduced moving-image data, and hence issuing a next VISCA command such as a STOP command to the laser disc player 101 and the video tape recorder 102 while monitoring the reproduced moving-image data.

In the above embodiments, the PVC has been described which assigns the fixed number of ATM cells required for communications depending on the transmission band in the ATM cell generator which inserts a control command into an ATM cell. An embodiment in which an SVC (Switched Virtual Connection) is employed to determine media to be communicated from the content of a control command each time the control command is issued, for thereby keeping a transmission band required for communications, will hereinafter be described.

For the SVC, a transmission band, i.e., the number of ATM cells, is established with respect to each session of communications. Therefore, the item of a transmission band is not necessary in the control signal table and the ATM cross-connect table.

For issuing a PLAY command from the multimedia personal computer 100 to the laser disc player 101, for example, the ATM cell generator in the first cell assembling/disassembling device 401 generates, upon reception of a VISCA command, an ATM cell to keep a transmission rate of 9600 bps, for example, which is required to transmit the PLAY command. When the second cell assembling/disassembling device 402 recognizes that a VISCA message received from the signal converter 111 through the control interface is an acknowledgment of the PLAY command for the laser disc player 101, the second cell assembling/disassembling device 402 transmits the VISCA message to the first cell assembling/disassembling device 401, and generates ATM cells required to transmit moving-image data. When the second cell assembling/disassembling device 402 receives moving-image data transmitted from the laser disc player 101 at the video/audio interface, the second cell assembling/disassembling device 402 refers to the control signal table to confirm that the communications line of VPI=20, VCI=2 may be used to transmit the acknowledgment to the VISCA address "0", which is a destination unit for the VISCA message. Then, the second cell assembling/disassembling device 402 writes VPI=20, VCI=2 in the ATM cells, insert the moving-image data into the information fields, and transmits the ATM cells.

Operation of the network at the time a STOP command "81 01 02 01 00 FF" is transmitted from the multimedia personal computer 100 having the VISCA address "0" to the signal converter 111 having the VISCA address "1" will be described below. The STOP command is transferred through the first cell assembling/disassembling device 401, the first ATM switcher 501, the second ATM switcher 502, and the second cell assembling/disassembling device 402 to the signal converter 111. The signal converter 111 transmits a VISCA message "90 41 FF" representing an acknowledgment of the STOP command to the second cell assembling/disassembling device 204. When the acknowledgment of the STOP command is received, since no moving-image data are transmitted, it is not necessary to keep ATM cells, and all the ATM cells in use are released. The ATM cells that are generated for communications are thus released at the time the acknowledgment of the STOP command is received.

With respect to the SVC, because necessary ATM cells are kept for each session of communications, necessary ATM cells may not be kept depending on the condition in which the network is used. For example, it is assumed that a PLAY command "81 01 02 01 28 FF" is transmitted from the multimedia personal computer 100 having the VISCA address "0" to the signal converter 111 having the VISCA address "1". The PLAY command "81 01 02 01 28 FF" is transferred through the first cell assembling/disassembling device 401, the first ATM switcher 501, the second ATM switcher 502, and the second cell assembling/disassembling device 402 to the signal converter 111. At this time, the second cell assembling/disassembling device 402 attempts to keep ATM cells. If ATM cells are used for another session of communications and as many ATM cells as required to transmit moving-image data are not available, then the second cell assembling/disassembling device 402 discards a VISCA message "90 41 FF" which represents an acknowledgment of the PLAY command from the signal converter 111. Since no acknowledgment of the PLAY command is sent from the signal converter 111, the multimedia personal computer 100 which is a destination unit for the VISCA message suffers timeout and issues an error message.

The signal converter 111 of a unit with which to communicate may not be switched on or may fail to operate. For example, it is assumed that a PLAY command "81 01 02 01 28 FF" is transmitted from the multimedia personal computer 104 having the VISCA address "0" to the signal converter 111 having the VISCA address "1". The PLAY command "81 01 02 01 28 FF" is transferred through the first cell assembling/disassembling device 401, the first ATM switcher 501, the second ATM switcher 502, and the second cell assembling/disassembling device 402 to the signal converter 111. At this time, the second cell assembling/disassembling device 402 attempts to keep ATM cells. In the absence of any acknowledgment of the PLAY command from the signal converter 111 due to a power failure or the like, the second cell assembling/disassembling device 402 suffers timeout, and does not keep ATM cells. Since no acknowledgment of the PLAY command is sent from the signal converter 111, the multimedia personal computer 100 which is a destination unit for the VISCA message suffers timeout and issues an error message.

According to the present invention, as described above, the multimedia communications apparatus has a table which stores data representing the correspondence between addresses of the interfaces of the multimedia personal computer and the AV devices and addresses on the network. For communications from the multimedia personal computer, the table is referred to for each session of communications to establish logic paths corresponding to channels on the network from the address of an interface related to an AV device. Therefore, the multimedia personal computer is capable of freely selecting a unit with which to communicate. Inasmuch as a transmission range, i.e., packets or cells required to transmit moving-image data, still-image data, sound data, or control data such as of VISCA commands, are prepared depending on the amount of such data at the time of communications, the circuit usage efficiency of the network with respect to the transmission range is increased. Since no limitations are imposed on the number of units with which to communicate, it is possible to carry out multimedia communications with any desired units.

Although certain preferred embodiments of the present invention have been shown and described in detail, it should be understood that various changes and modifications may be made therein without departing from the scope of the appended claims.

What is claimed is:

1. A multimedia communications apparatus, serving as a node in a packet or cell network, for connecting an AV device or a multimedia computer which handles multimedia information including moving-image and sound data to the network, so that the AV device or the multimedia computer will communicate with other AV devices or multimedia computers connected to other nodes on the network, the AV device having such functions that capture, record, process, and/or replay the multimedia information, the multimedia communications apparatus comprising:

a control interface, coupled to the AV device or multimedia computer, for transmitting and receiving AV device control signals to/from the AV device or the multimedia computer which is coupled thereto, the AV device control signals including command signals to activate and stop the functions provided in the AV device;

a video/audio interface, coupled to the AV device or multimedia computer, for transmitting and receiving the multimedia information to/from the AV device or the multimedia computer which is coupled thereto;

a packet generator/separator for generating packets or cells based on data received from said control interface and said video/audio interface, and separating packets or cells received from the network and transmitting the packets or the cells to said control interface and said video/audio interface; and control means for controlling said packet generator/separator to separate packet data or cell data transmitted from the network and having an originating unit address and a destination unit address to transmit the separated packet data or cell data to the AV device or the multimedia computer, and for controlling said packet generator/separator to generate packets or cells from data which are received from the AV device or the multimedia computer based on the packet or cell data transmitted thereto, and to transmit the generated packets or cells to the destination unit address which is stored in the packet data or cell data received from the network.

2. A multimedia communications apparatus, serving as a node in a packet or cell network, for connecting an AV device or a multimedia computer which handles multimedia information including moving-image and sound data to the network, so that the AV device or the multimedia computer will communicate with other AV devices or multimedia computers connected to other nodes on the network, the AV device having such functions that capture, record, process, and/or replay the multimedia information, the multimedia communications apparatus comprising:

a control interface, coupled to the AV device or multimedia computer, for transmitting and receiving AV device control signals to/from the AV device or the multimedia computer which is coupled thereto, the AV device control signals including command signals to activate and stop the functions provided in the AV device;

a video/audio interface, coupled to the AV device or multimedia computer, for transmitting and receiving the multimedia information to/from the AV device or the multimedia computer which is coupled thereto;

a packet generator/separator for generating packets or cells based on data received from said control interface and said video/audio interface, and separating packets or cells received from the network and transmitting the packets or the cells to said control interface and said video/audio interface;

a table for storing data representative of the correspondence between an identifier of the AV device or the multimedia computer and an address thereof on the network connected to the AV device or the multimedia computer; and control means for controlling said packet generator/separator to generate packets or cells from data which are received from the AV device or the multimedia computer and which specify a unit with which to communicate with the identifier of the AV device or the multimedia computer, and to transmit the generated packets or cells to the address on the network which is determined from said table by said identifier.

3. The multimedia communications apparatus according to claim 1, wherein said control means comprises means for capturing as many packets as required to transmit data to the network when the data are received from the AV device or the multimedia computer.

4. The multimedia communications apparatus according to claim 3, further comprising a table for storing data representative of medium types to be communicated and communication rates, said control means comprising means for determining as many packets as required to transmit data to the network by referring to the table.

5. The multimedia communications apparatus according to claim 3, wherein said control means comprises means for changing packets in use to packets not in use when a completion message indicative of the completion of communications of the moving-image data or the sound data is received from said control interface.

6. The multimedia communications apparatus according to claim 3, wherein said control means comprises means for indicating a failure to capture packets to a unit to which data are to be transmitted, if required packets cannot be captured.

7. A multimedia communications apparatus, serving as a node in a packet or a cell network, for connecting an AV device or a multimedia computer which handles multimedia information including moving-image and sound data to the network, so that the AV device or the multimedia computer will communicate with other AV devices or multimedia computers connected to other nodes on the network, the AV device having such functions that capture, record, process, and/or replay the multimedia information, the multimedia communications apparatus comprising: cell assembling/disassembling means including:

- a control interface, coupled to the AV device or multimedia computer, for transmitting and receiving AV device control signals to/from the AV device or the multimedia computer which is coupled thereto, the AV device control signals including command signals to activate and stop the functions provided in the AV device,
- a video/audio interface, coupled to the AV device or multimedia computer, for transmitting and receiving the multimedia information to/from the AV device or the multimedia computer which is coupled thereto,
- a packet generator for generating ATM cells based on data received from said control interface and said video/audio interface and separating received ATM cells and transmitting the ATM cells to said control interface and said video/audio interface, and
- a control signal table for storing data representing the correspondence between addresses of the AV device or the multimedia computer as originating and destination units and communication paths; and an ATM switcher having an ATM cross-connector for exchanging the ATM cells and an ATM cross-connect table for storing data representative of the correspondence between communication paths with said cell assembling/disassembling means and communication paths with other multimedia communications apparatus.

8. The multimedia communications apparatus according to claim 7, wherein said packet generator comprises means for determining media to be communicated from the content of a control command issued from the AV device or the multimedia computer, and establishing a fixed communication path required to communicate the media before the media start being communicated.

9. The multimedia communications apparatus according to claim 7, wherein said packet generator comprises means for determining media to be communicated from the content of a control command issued from the AV device or the multimedia computer, and specifying a communication path for each session to communicate the media before the media start being communicated.

10. The multimedia communications apparatus according to claim 9, wherein said packet generator comprises means for releasing the communication path used to communicate the media based on the content of a control message transmitted from the AV device, when a session of multimedia communications is completed.

11. The multimedia communications apparatus according to claim 9, wherein said packet generator comprises means for indicating, upon a failure to prepare as many ATM cells as required to communicate the media, said failure to the multimedia computer when the communication path is established.

12. The multimedia communications apparatus according to claim 9, wherein said packet generator comprises means for indicating, upon a failure of the AV device to transmit the media, said failure to the multimedia computer.

* * * * *